United States Patent
Wierzchon

[11] Patent Number: 6,125,526
[45] Date of Patent: Oct. 3, 2000

[54] METHOD OF FASTENING A FIRST MEMBER TO A SECOND MEMBER

[75] Inventor: Peter Jack Wierzchon, South Bend, Ind.

[73] Assignee: Robert Bosch Corporation, Broadview, Ill.

[21] Appl. No.: 09/310,793

[22] Filed: May 12, 1999

[51] Int. Cl.[7] .............................. B23P 11/00; B21J 15/02; F16B 35/04

[52] U.S. Cl. .................................... 29/525.02; 29/525.05; 29/525.11; 411/412; 411/335

[58] Field of Search ........................... 29/525.02, 525.05, 29/525.11, 452, 456; 403/337; 411/277, 336, 399, 388, 415, 424, 412, 413, 335

[56] References Cited

U.S. PATENT DOCUMENTS

| | | | |
|---|---|---|---|
| 2,931,411 | 4/1960 | Keehan | 411/335 |
| 3,163,079 | 12/1964 | Schertz | 411/415 |
| 3,418,012 | 12/1968 | Torre | 29/525.02 |
| 4,018,132 | 4/1977 | Abe | 411/413 |
| 4,790,702 | 12/1988 | Maganias | 29/525.02 |
| 4,815,907 | 3/1989 | Williamson et al. | 411/413 |
| 4,877,364 | 10/1989 | Sorrentino | 411/412 |
| 5,233,833 | 8/1993 | Last, Jr. et al. | 60/547.1 |
| 5,609,454 | 3/1997 | Lee | 411/412 |

*Primary Examiner*—David P. Bryant
*Attorney, Agent, or Firm*—Leo H McCormick, Jr.; Warren Comstock

[57] ABSTRACT

A method of fastening a first member to a second member. The first member has a first opening with first left handed threads that extend from a first surface to a second surface. A stud having a shaft with a first section having right handed threads that extend from an end to a first groove, a second section with second left handed threads that extend from the first groove to a second groove adjacent a head and a radial surface that extends on an angle from the second groove toward a peripheral surface on the head is obtained from a supply source. The shaft is inserted into the first opening to engage the first and second left handed threads and an initial torque is applied to the head to bring the radial surface into engagement with the first left handed threads. Thereafter, additional torque is applied to the head to cause the radial surface to engage and deform a portion of the first left handed threads as the peripheral surface is moved into engagement with the second surface. A reversing torque is applied to the head to move the peripheral surface away from the second surface and permit the second end to pivot in a corresponding arc with respect to the axis of the first opening. A second member is obtained from a supply and a second opening therein is aligned with the second end of the shaft. A nut is placed on the right handed threads and an initial torque applied to the nut to bring the second housing into engagement with the first surface. Thereafter, a final torque is applied to the nut to cause the first and second left handed threads to corresponding rotate and bring the head into engagement with the second surface and create a desired compressive force between the nut and head to fasten the second member with the first member.

4 Claims, 1 Drawing Sheet

METHOD OF FASTENING A FIRST MEMBER TO A SECOND MEMBER

This invention relates to a method of fastening a first member to a second member through a stud is retained in the first member.

BACKGROUND OF THE INVENTION

It is common practice to join two members together through the use of bolts which act on flanges to produce a compressive force to define a unitary structure. In some applications such as in the manufacture of brake assemblies it is desirable to attach mounting studs to a booster member and later attach a master cylinder member at a different location to define the brake assembly, such structure can be found in U.S. Pat. No. 5,233,833. This procedure is adequate for most applications as long as the manufacturing tolerances for the corresponding openings in the flange on the master cylinder and the studs are within a desired alignment. In situations where the alignment is not within the desired tolerances, it is possible to either damage the studs or to introduce undesirable stress in the flange when master cylinder is attached to the brake booster. In order to reduce the effect of misalignment caused by manufacturing tolerance alignment studs have been loosely connected to the brake booster and later manually aligned with opening in the flange to produce a unitary structure. Unfortunately, this use of this type structure has resulted in lost studs.

SUMMARY OF THE INVENTION

In an effort to offset the effect of manufacturing tolerances by providing a non-rigid stud and yet assure that a stud remains connected with a brake booster the following method of joining a first member with a second member was developed. In this method, a first opening in a flange on the brake booster is threaded with left handed threads that extend from a first surface to a second surface. A stud is selected from a source with a shaft that has a first section with right handed threads that extend from its end to a first groove, a second section with left handed threads that extend from the first groove to a second groove adjacent a head. The second groove has a radial surface that extends on an angle from the bottom of the second groove toward a peripheral surface on the head. The end of the shaft is inserted into the first opening to bring the first and second left handed threads into engagement and an initial torque is applied to the head until the radial surface contacts the first left handed threads. Thereafter, additional torque is applied to the head to cause the radial surface to deform a portion of the first left handed threads as head is moved into engagement with the second surface. A reversing torque is applied to loosen and move the head away from the second surface a distance of about one-half the width the second groove. Disengagement of the head from the second surface permits the second end to pivot in a corresponding arc with respect to the axis of the first opening while at the same time the deformed portion of the first left handed treads prevents the stud from bring removed from the first member. A second member is obtained from a supply and a second opening therein on the flange is aligned with the second end of the shaft. A nut is placed on the right handed threads and an initial torque applied to the nut to bring the second member into engagement with the first surface. Thereafter, a final torque is applied to the nut to cause the first and second left handed threads to correspond ing rotate and bring the head into engagement with the second surface and create a desired compressive force between the nut and head to fasten the master cylinder with the brake booster.

An advantage of the present invention resides in the retention of a stud in a first member through the deformation of a portion of a threaded surface on the first member.

A further advantage of this invention is to provide a fastener systems whereby a stud may pivot about an axis of a threaded bore to attenuate the effects of manufacturing tolerances between an opening in a flange and the axis.

A further advantage of this method of fastening a first member to a second member resides in the deformation of a portion of a threaded surface by an inclined surface on a head of a stud, the deformed thread retains the stud in the treaded surface.

DETAILED DESCRIPTION

Figure 1:
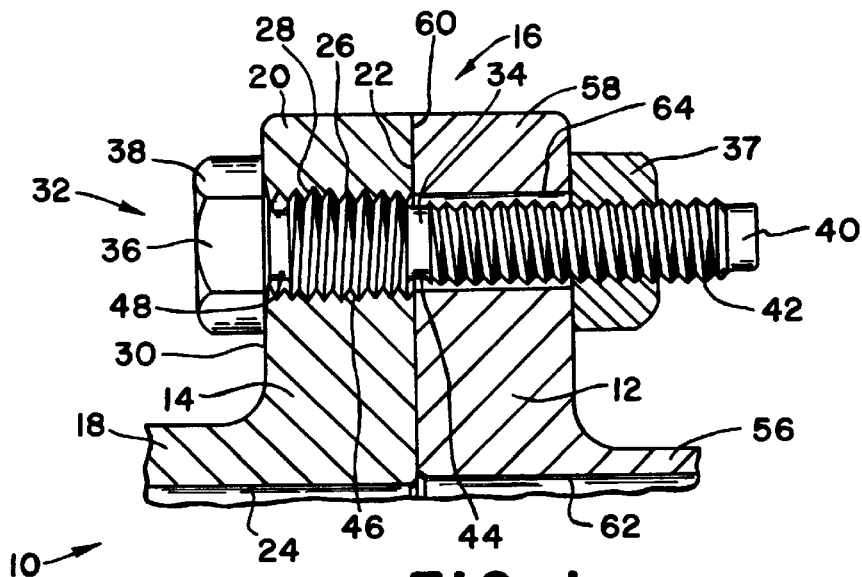
FIG. 1 is a schematic illustration of a first member to which as second member is fastened according to the present invention.

A portion of brake assembly 10 is shown in FIG. 1 wherein a master cylinder 12 is attached to a brake booster 14 through a fastener arrangement 16 to define a unitary structure.

The brake booster 14 has a plurality of flanges 20, only one of which is shown, that extend from a housing 18 such that a first surface 22 is perpendicular to bore 24. Each flange 20 has a opening 26 therein that is parallel with bore 24 and threaded with left hand threads 28. The threads 28 correspondingly extend from the first surface 22 to a second surface 30.

The fastener arrangement 16 for each flange includes a plurality of studs 32, only one of which is shown, each of which is identical and having the following characteristics. A shaft 34 with a head 36 located on a first end 38 and a second end 40. The shaft 34 has a first section 42 with right handed threads that extends from the second end 40 to a first groove 44 and a second section 46 with left handed threads that extends from the first groove 44 to a second groove 48 adjacent the head 36. The shaft 34 has a radial surface 50 that extends on an angle from the bottom 52 of the second groove 48 toward a peripheral surface 54 on the head 36 such the radial surface 50 defines a portion of a cone from the peripheral surface 54 toward the axis of shaft 34. The first section 42 which is threaded with right handed threads has a smaller diameter than the second section 46 which is threaded with left handed treads.

The master cylinder 12 has a plurality of flanges 58, only one of which is shown which extend from a housing 56 such that end surface 60 is located in a plane which is perpendicular with bore 62. Each flange 58 has a corresponding opening 64 therein which is parallel with the bore 62.

Method of Attaching a First Member to a Second Member

The manufacture of the brake assembly 10 begins with the selection of a brake booster first member 14, a plurality of studs 32 and a master cylinder second member 12 from a sources of supply.

The brake booster 14 is characterized by a housing 18 with flanges 20 that extend perpendicular outwardly. Each flange has an opening 26 that is parallel with the axis of the housing 18 with left handed treads 28 that extend from a first surface 22 to corresponding second surface 30.

Each stud 32 is characterized by a shaft 34 with a head 36 on a first end 38 and a second end 40 with a first section 42 having with right handed threads that extending from the second end 40 to a first groove 44 and a second section 46 with left handed threads that extend from the first groove 44 to a second groove 48 adjacent the head 36 and a radial surface 50 that extends on an angle from the second groove 48 toward a peripheral surface 54 of the head 36.

Figure 2:
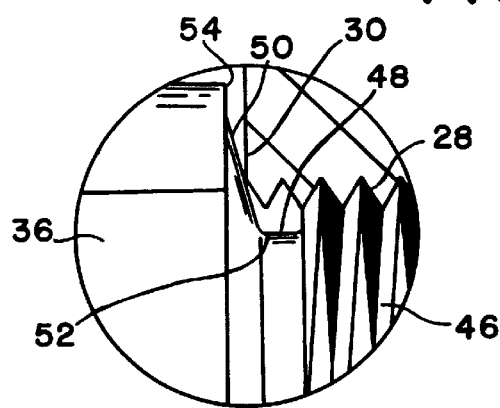
FIG. 2 is an enlarged sectional view of a stud of FIG. 1 on initial engagement of an inclined surface of a head with a first surface adjacent a threaded opening in the first member in according to the present invention.
Figure 3:
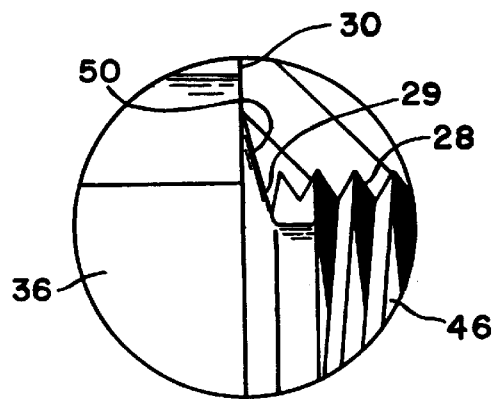
FIG. 3 is an enlarged sectional view of FIG. 2 on total engagement of head of the stud of FIG. 2 with the first surface.

The second end 40 of a stud 36 is inserted into a corresponding opening 26 to bring the left handed threads located on the second sections 46 into engagement with corresponding left handed threads 28 as shown in FIG. 2 for a flange 20 in housing 18. The first section 42 pass through openings 26 without engagement of the right handed threads as the shaft 34 is smaller than the diameter than the second section 46. Thereafter, an initial torque is applied to rotate head 36 and bring radial surfaces 50 into engagement with the first left handed threads adjacent the second surface 30. When additional or continued torque is applied to head 36 to move heads 36 toward the second surfaces 30 radial surface 50 engages and deforms a portion 29 at least the first tooth, into groove 48 in a manner as shown in FIG. 3 when heads 36 engage surfaces 30.

This same procedure is applied to an additional stud for a brake assembly 10.

Figure 4:
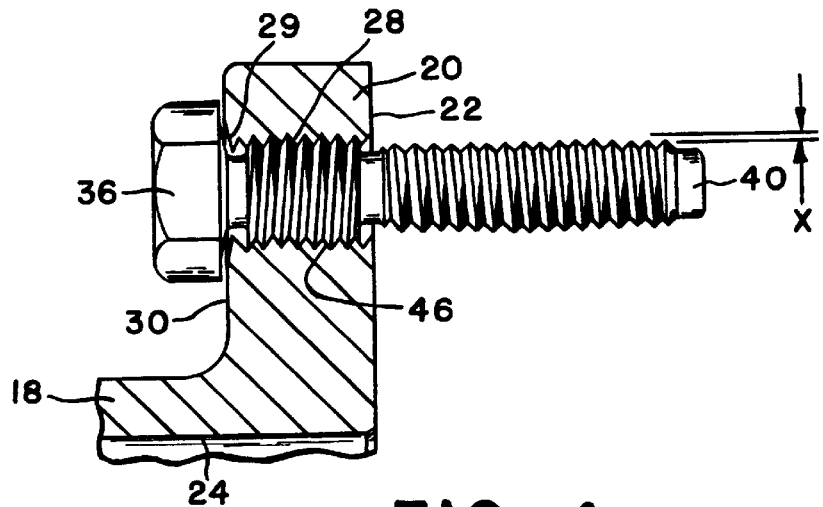
FIG. 4 is an enlarged sectional view of FIG. 3 showing the stud in a pre-assembly retained condition wherein an end of the shaft of the stud is capable of limited pivotal movement about the axis of the threaded opening in the first member.

Thereafter, a reversing torque is applied to the heads 36 to move the heads 36 a distance of about one turn or one-half of the width of groove 48 away from the second surfaces 30 to permit the corresponding second ends 40 to pivot in a corresponding arc, having a distance of "x", with respect to the axis of first openings 26 as shown in FIG. 4.

The engagement of the left handed threads on the second sections 46 with corresponding the deformed threads 29 prevents studs 36 from being displaced from housing 18 and as a result the brake booster 14 may be assembled in one location and shipped to a second location to complete the manufacture of the brake assembly 10.

A master cylinder 12 is characterized by a housing 56 having flanges 58, only one of that is shown, which extend in a perpendicular manner from the housing 56 with openings 64 that are parallel with the bore 62. Openings 64 are aligned with ends 40 of studs 32 and end surface 60 of the master cylinder 12 is brought into engagement with the first surface 22 of housing 18. Studs 32 are capable of pivoting in openings 26 as heads 36 are not engaged with surface 30 and as a result the output push rod of the brake booster and piston in the master cylinder are more easily aligned.

Nuts 37 is placed on threads on the second section 40 of studs 32 and a torque is applied to screw or rotate the nuts 37 to initially bring the nuts 37 into corresponding engagement with flanges 58. Further and/or additional torque is applied the nuts 37 causing the left handed threads on section 46 to rotate and bring heads 36 into engagement with the second surfaces 30 to create a desired compressive force between nuts 37 and heads 30 to fasten the master cylinder 12 with the brake booster 14.

I claim:

1. A method of fastening a first member to a second member comprising the steps of:

obtaining said first member from a source, said first member having a first opening with first left handed threads that extend from a first surface to a second surface;

obtaining a stud from a supply, said stud having a shaft with a head on a first end and a second end, said shaft having a first section with right handed threads that extend from said second end to a first groove and a second section with second left handed threads that extend from said first groove to a second groove adjacent said head, said shaft having a radial surface that extends on an angle from said second groove toward a peripheral surface on said head; said first threaded section having a smaller diameter than said second threaded section;

inserting said shaft into said first opening to bring said second left handed threads into engagement with said first left handed threads;

applying an initial torque to said head to bring said radial surface on said shaft into engagement with said first left handed threads;

applying a continued torque to said head to cause said radial surface to deform a portion of said first left handed threads adjacent said second surface as said head is moved into engagement with said second surface;

reversing said torque applied to said head to move said head away from said second surface and permit said second end of said shaft to pivot in a corresponding arc with respect to the axis of said first opening;

obtaining a second member from a supply and aligning a second opening therein with said second end of said shaft;

moving said second member, with said first section of said shaft extending through said second opening, into engagement with said first surface on said first member;

positioning a nut onto said second end of said shaft; and applying a torque to screw said nut onto said right handed threads causing said first and second left handed threads to corresponding rotate and bring said head into engagement with said second surface to create a desired compressive force between said nut and head to fasten said first and second members.

2. The method of fastening a first member to a second member as recited in claim 1 wherein said step of applying a reverse torque moves said head away from said second surface on said first member a distance approximately equal to one half the width of said second groove.

3. The method of fastening a first member to a second member as recited in claim 2 wherein said step of deforming a portion of said first left handed threads displaces a portion of said first left handed threads into said second groove.

4. The method of fastening a first member to a second member a recited in claim 3 wherein said step of displacing as portion of said first left handed threads into said second groove prevents said stud from being removed from said first member.

* * * * *